(12) United States Patent
Zhang et al.

(10) Patent No.: US 10,796,174 B2
(45) Date of Patent: Oct. 6, 2020

(54) DISTANCE AND OBJECT BASED EXTERNAL NOTIFICATION SYSTEM FOR AUTOMATED HAILING SERVICE

(71) Applicants: Nissan North America, Inc., Franklin, TN (US); Renault S.A.S., Boulogne-Billancourt (FR)

(72) Inventors: Jingyi Zhang, San Jose, CA (US); Simon Tien, Santa Clara, CA (US); Melissa Cefkin, San Jose, CA (US); Laura Cesafsky, San Francisco, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 45 days.

(21) Appl. No.: 16/230,960

(22) Filed: Dec. 21, 2018

(65) Prior Publication Data
US 2020/0202149 A1 Jun. 25, 2020

(51) Int. Cl.
*G06K 9/00* (2006.01)
*G08B 21/24* (2006.01)
*G08G 1/00* (2006.01)
*G05D 1/00* (2006.01)
*G01C 21/34* (2006.01)

(52) U.S. Cl.
CPC ..... *G06K 9/00838* (2013.01); *G01C 21/3438* (2013.01); *G05D 1/0088* (2013.01); *G08B 21/24* (2013.01); *G08G 1/202* (2013.01); *G05D 2201/0213* (2013.01)

(58) Field of Classification Search
CPC .... G06K 9/00838; G08B 21/24; G08G 1/202; G05D 1/0088; G05D 2201/0213; G01C 21/3438

USPC ... 340/425.5, 426.22, 426.23, 426.4, 426.25, 340/438, 457, 539.1, 539.11
See application file for complete search history.

(56) References Cited

U.S. PATENT DOCUMENTS 7,095,336 B2 8/2006 Rodgers et al.
9,720,416 B1 8/2017 Rao
(Continued)

FOREIGN PATENT DOCUMENTS

EP 3173294 A1 5/2017

OTHER PUBLICATIONS http://www.forbes.com/sites/jimgorzelany/2016/09/16/the-smiling-car-concept-gives-autonomous-autos-a-great-big-emoji/#50b330d696c0 <http://www.forbes.com/sites/jimgorzelany/2016/09/16/the-smiling-car-concept-gives-autonomous-autos-a-great-big-emoji/>, Sep. 16, 2016.

(Continued)

*Primary Examiner* — Daryl C Pope
(74) *Attorney, Agent, or Firm* — Young Basile Hanlon & MacFarlane, P.C.

(57) ABSTRACT

Distance and object based external notification system for automated hailing service is described. An autonomous vehicle (AV) can include a processor configured to execute instructions stored on a non-transitory computer readable medium to detect, based on sensor information, an object within the AV; determine that the object belongs to a recent occupant of the AV; and, in response to the determining that the object belongs to the recent occupant of the AV, select, based on a proximity of the recent occupant to the AV, a notification modality for sending a message to the recent occupant regarding the object; and send the message using the notification modality.

21 Claims, 8 Drawing Sheets

(56) References Cited

U.S. PATENT DOCUMENTS

| | | | |
|---|---|---|---|
| 10,289,922 B1* | 5/2019 | Wengreen | G05D 1/0088 |
| 2012/0059661 A1 | 3/2012 | Colodny et al. | |
| 2014/0062665 A1 | 3/2014 | Tuttle | |
| 2015/0035685 A1 | 2/2015 | Strickland et al. | |
| 2015/0061856 A1 | 3/2015 | Raman et al. | |
| 2016/0332535 A1 | 11/2016 | Bradley et al. | |
| 2017/0132696 A1* | 5/2017 | Haparnas | G06Q 30/0645 |
| 2017/0213164 A1* | 7/2017 | Rainbolt | G06Q 10/02 |
| 2017/0213165 A1* | 7/2017 | Stauffer | G06Q 10/02 |

OTHER PUBLICATIONS

Video: <https://www.youtube.com/watch?v=INqWGr4dfnU>, Sep. 15, 2016.
http://www.autoblog.com/2016/08/30/drive-ai-autonomous-car-emoji/, Aug. 30, 2016.
https://www.viktoria.se/projects/AVIP, as early as Apr. 23, 2018.
Video: <https://www.youtube.com/watch?v=L22S2VGB5Xw>, Jul. 24, 2017.
Video: <https://www.youtube.com/watch?v=ZUJdKA4JV_s>, Nov. 8, 2017.
https://mashable.com/article/rear-door-alert-nissan-back-seat/#BNIBoeOTokqB, Jul. 31, 2018.
U.S. Appl. No. 15/253,565, filed Aug. 31, 2016.
U.S. Appl. No. 15/621,862, filed Jun. 13, 2017.
U.S. Appl. No. 16/024,231, filed Jun. 29, 2018.

* cited by examiner

DISTANCE AND OBJECT BASED EXTERNAL NOTIFICATION SYSTEM FOR AUTOMATED HAILING SERVICE

TECHNICAL FIELD

This disclosure relates to autonomous driving, including providing a service via an autonomous vehicle.

BACKGROUND

A vehicle, such as an autonomous vehicle, may traverse a portion of a vehicle transportation network. In traversing the vehicle transportation network, the vehicle may provide a service, such as a taxi service, a shuttle, a delivery service, or the like. A service recipient (such as a customer, a passenger, or the like) of the vehicle may inadvertently leave an item in vehicle and/or not fully finish an in-vehicle activity when the service completes.

SUMMARY

Disclosed herein are aspects, features, elements, implementations, and embodiments of interactive external vehicle-user communication.

An aspect of the disclosed embodiments is an autonomous vehicle (AV), the AV including a processor configured to execute instructions stored on a non-transitory computer readable medium to detect, based on sensor information, an object within the AV; determine that the object belongs to a recent occupant of the AV; and, in response to the determining that the object belongs to the recent occupant of the AV, select, based on a proximity of the recent occupant to the AV, a notification modality for sending a message to the recent occupant regarding the object; and send the message using the notification modality.

Another as of the disclosed embodiments is an autonomous vehicle (AV) including a processor configured to execute instructions stored on a non-transitory computer readable medium to detect, based on sensor information, an object within the AV; select, based on a first distance of a recent occupant to the AV, a first notification modality for sending a message to the recent occupant, the message indicating that the object is left by the recent occupant in the AV; send, using the first notification modality, the message to the recent occupant; select, based on a second distance of the recent occupant to the AV, a second notification modality for sending the message to the recent occupant; and send, using the second notification modality, the message to the recent occupant.

Another aspect of the disclosed embodiments is a method for providing a service by an autonomous vehicle (AV). The method includes detecting, based on sensor information, an object within the AV; selecting, based on a first distance of a recent occupant to the AV, a first notification modality for sending a first message to the recent occupant, the first message indicating that the object is left by the recent occupant in the AV; sending, using the first notification modality, the first message to the recent occupant; selecting, based on a second distance of the recent occupant to the AV, a second notification modality for sending a second message to the recent occupant; and sending, using the second notification modality, the second message to the recent occupant.

Another aspect of the disclosed embodiments is an autonomous vehicle (AV) including a processor configured to execute instructions stored on a non-transitory computer readable medium to detect that a recent occupant of the AV has not completed an in-vehicle activity; and in response to the detecting that the recent occupant of the AV has not completed an in-vehicle activity, select, based on a proximity of the recent occupant to the AV, a notification modality for sending a message to the recent occupant regarding the in-vehicle activity; and send the message using the notification modality.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
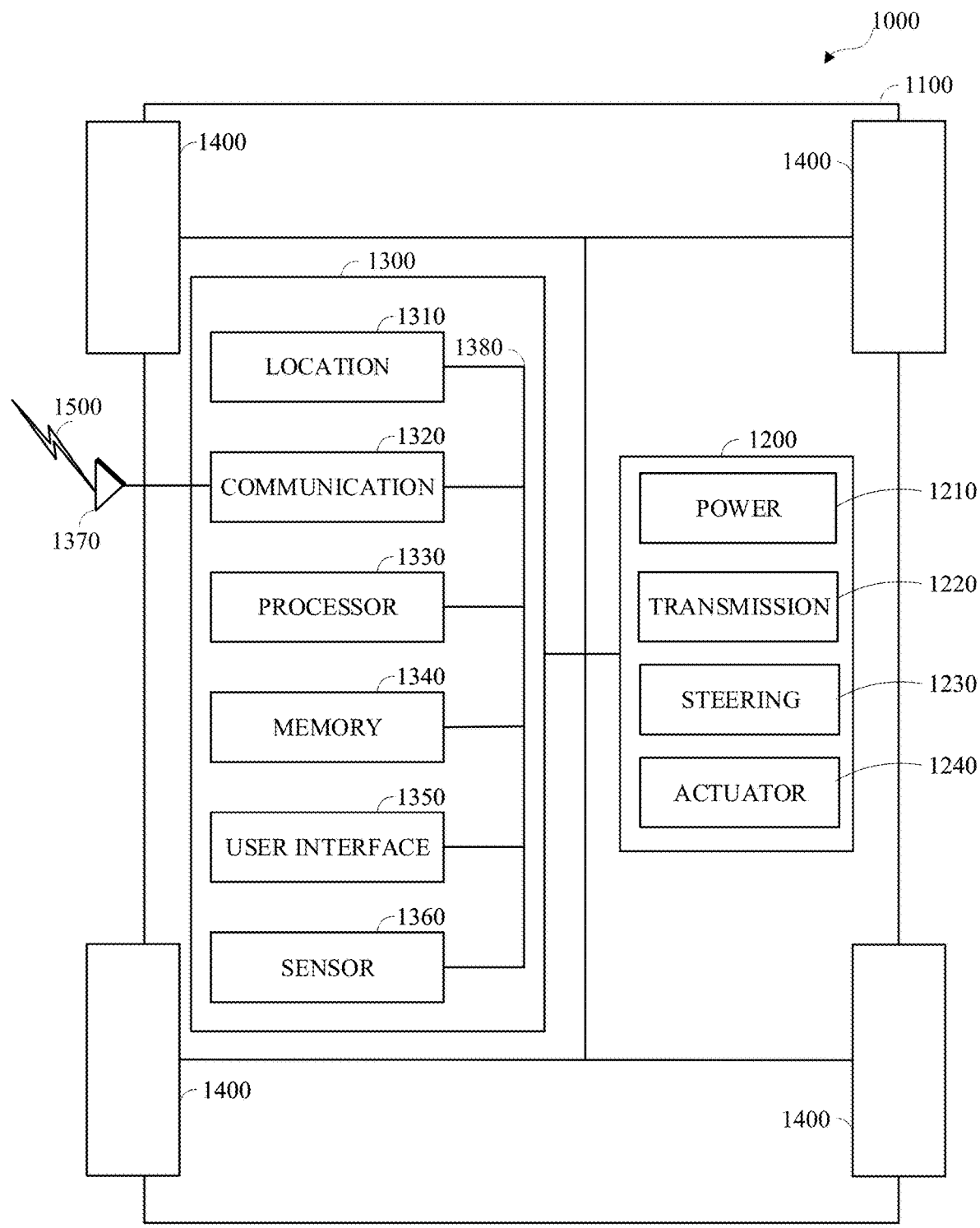
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network, to provide a service. In an example, the vehicle, may operate as a taxi. That is, the service can be a taxi service.

The taxi (i.e., the vehicle) may roam (e.g., autonomously) the vehicle transportation network to pick up customers. The terms "customer" and "passenger" may be used interchangeably herein. The vehicle may be hailed by a customer by way of a physical gesture. Upon entry into the vehicle, the customer may provide a destination address. The customer can provide the destination address verbally (e.g., for example, in response to a prompt by a human-machine interface of the vehicle). The customer can provide the destination address electronically, such as by typing the address into a console of the vehicle. Other ways may be available for the customer to provide the destination address.

The destination may be provided by the customer in the form of a physical address, a cross road location, a landmark name, GPS coordinates, or some other form.

In another example, the customer may hail the vehicle via a computer application, such as an application operating on a device, such as a handheld device (e.g., a mobile device, a tablet, a phablet, or the like). The customer may send a request, via the computer application, to a dispatching location, which may be a computer-based (such a cloud-based) application that receives a request, which can include the location of the customer. The computer-based application may electronically dispatch a vehicle to the customer location. The request may also include a destination of the customer.

In yet other examples, the service can be a shuttle service. As used herein, a shuttle service is similar to a taxi service except that the vehicle can be simultaneously used (e.g., occupied) by more than one customer.

Efficiently providing the service may include providing information to a customer. In some examples, customer information that can be used to contact the customer may be available for providing information to the customer. For example, information may be provided via a phone number, an email address, some other customer information, or a combination thereof.

For example, information regarding items that a customer may be leaving behind (e.g., leaving inside the vehicle) may need to be provided (e.g., output, sent, communicated, etc.) to the customer when the customer leaves the vehicle, such as at the end of the service. The end of the service can mean that the vehicle has arrived at the destination provided by the customer.

For example, information regarding activities related to the service may need to be provided to the customer. For example, information regarding un-finished activities related to the service may need to be provided. Examples of un-finished activities can include that the customer did not close a compartment (e.g., a trunk, a door, etc.) of the vehicle upon retrieving an item of the customer; an incomplete payment (such as due to a declined credit card, an insufficient balance in a debit account, or the like) by the customer for the service.

Providing information (e.g., a message) to the customer may include determining various parameters for determining a notification modality for outputting the message and outputting the message using the notification modality, which may improve the quality, or at least the perceived quality, of the service by the customer. For example, the customer may use the message to retrieve a left-behind item, to close a compartment of the vehicle, to complete an un-finished activity, or a combination thereof.

The various parameters for determining the notification modality can include a distance of the customer from the vehicle, a determined value of a left-behind item, the compartment that is left open, the nature of the un-finished activity, more, fewer, other parameters, or a combination thereof.

Outputting the message may include controlling one or more notification modalities to output the message.

The notification modalities available for the vehicle to output the message, may include haptic feedback, one or more interior (e.g., inside the vehicle) luminous presentation units, one or more external luminous presentation units, one or more internal aural presentation units, one or more external aural presentation units, one or more electronic communication network control units, one or more velocity, kinetic state, or motion control units, or a combination thereof. Fewer, more, or other modalities can also be available.

Outputting the message may include operating one or more touch and/or non-touch haptic mechanisms, such as vibrating a part of the vehicle. The haptic feedback may be provided via touch and/or non-touch feedback mechanisms or technologies.

Outputting the message may include controlling an external and/or an internal luminous presentation unit, or a combination of external and/or internal luminous presentation units, of the vehicle to output at least a portion of the message.

An internal luminous presentation unit may be, for example, one or more interior lights, individual lights, groups of lights, such as light bars, light strips, light emitting diode (LED) strips, color-changing light strips, in-vehicle graphic displays, image projectors, augmented reality devices, text displays, or any other unit or device capable of outputting any portion of the message through the control or manipulation of light.

An external luminous presentation unit may be, for example, one or more headlights, taillights, turn signals, individual lights, groups of lights, such as light bars, light strips, light emitting diode (LED) strips, color-changing light strips, on-vehicle graphic displays, image projectors, augmented reality devices, text displays, or any other unit or device capable of outputting any portion of the message of the vehicle control information through the control or manipulation of light.

For example, controlling the external luminous presentation unit may include controlling a brightness or luminance of the external luminous presentation unit, controlling a color or combination of colors of the external luminous presentation unit, controlling a direction of output of the external luminous presentation unit, controlling an output frequency, rate, timing, or period of the external luminous presentation unit, controlling motion of the luminous output or the external luminous presentation unit, controlling a pattern of the luminous output, controlling an animation of the luminous output, or otherwise modulate the output of the external luminous presentation unit, controlling the external luminous presentation unit to display, or otherwise output, text, graphics, or a combination thereof, controlling the external luminous presentation unit to animate the output of the external luminous presentation unit, or any combination thereof.

Outputting the message may include controlling an external and/or an internal aural presentation unit, or a combination of external and/or internal aural presentation units, of the vehicle to output at least a portion of the message. An aural presentation unit (e.g., an internal or an external aural presentation unit) may be, for example, a horn, a speaker, or any other unit or device capable of outputting any portion of the message of the vehicle control information through the control or manipulation of sound. For example, controlling the external (internal) aural presentation unit may include controlling a frequency, tone, phase, or amplitude of the external aural presentation unit, which may include controlling the external (internal) aural presentation unit to output a sequence or series of sounds.

Outputting the message may include controlling an electronic communication network control unit of the vehicle to output information indicating at least a portion of the message, such as by outputting, sending, broadcasting, or transmitting an electronic communication signal via an electronic communication medium to an external device.

For example, the external device may be a mobile device of the customer; and outputting the message can include sending a text message, an SMS, or the like to the customer. For example, the electronic communication signal can include sending an email to the customer.

Outputting the message may include controlling a velocity control unit, which may include controlling a directional state control unit of the vehicle, a kinetic state control unit of the vehicle, or both, to output at least a portion of the message of the vehicle control information.

Controlling a directional state control unit, such as a steering unit, of the vehicle to output at least a portion of the message of the vehicle control information may include controlling the directional state control unit to control, or alter, a directional state of the vehicle, such as by turning or steering the vehicle, such that at least a portion of the message of the vehicle control information is output. Controlling the directional state may include maintaining a current directional state such that at least a portion of the message of the vehicle control information is output.

Controlling a kinetic state control unit, such as an accelerator or a braking unit, of the vehicle to output at least a portion of the message of the vehicle control information may include controlling the kinetic state control unit to control, or alter, a kinetic state of the vehicle, such as by accelerating or decelerating the vehicle, such that at least a portion of the message of the vehicle control information is output. Controlling the kinetic state may include maintaining a current kinetic state such that at least a portion of the message of the vehicle control information is output.

Implementations according to this disclosure provide an external notification system designed, for example, for roboservice (e.g., autonomous shuttle, autonomous taxi, autonomous delivery, etc.). Situations whereby a customer leaves behind an item in the vehicle can be resolved by implementations of this disclosure. Some such situations may be referred to as lost-and found situations. A system and/or a process of the vehicle can notify a customer when a left-over (i.e., left-behind) item in the vehicle is detected upon the customer leaving or is away from the vehicle. In an example, notification messages can be triggered (e.g., sent, delivered, output, read out, conveyed, or triggered in any way possible) via different modalities based at least on one of a category of the left-behind item, a distance of the customer from the vehicle, a value of the item, a location of the item within the vehicle, more, fewer, other criteria, or a combination thereof.

Additional situations that can be resolved by implementations according to this disclosure can include calling back a customer because of an unfinished in-vehicle activity. Examples of unfinished in-vehicle activity can include unfinished/uncompleted in-vehicle payment and the customer leaving a door or a trunk of vehicle open. In such situations and based, for example, on the importance of the unfinished activity, the customer distance from the vehicle, other criteria, or a combination thereof, different notification messages can be triggered via different modalities.

Implementations according to this disclosure can provide a control logic for combining object and/or event attributes and customer distance to trigger, for example, the external notifications system and the solution (as further described below).

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. As shown, a vehicle 1000 includes a chassis 1100, a powertrain 1200, a controller 1300, wheels 1400, and may include any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

The controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500. Although FIG. 1 shows the electronic communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the electronic communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. The communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 may be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 may include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

The sensors 1360 may include sensors that are operable to obtain information regarding the physical environment surrounding the vehicle 1000. For example, one or more sensors may detect road geometry and obstacles, such as fixed obstacles, vehicles, and pedestrians. The sensors 1360 may be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. The trajectory controller may output signals operable to control the vehicle 1000 such that the vehicle 1000 follows the trajectory that is determined by the trajectory controller. For example, the output of the trajectory controller may be an optimized trajectory that may be supplied to the powertrain 1200, the wheels 1400, or both. In some embodiments, the optimized trajectory may be control inputs such as a set of steering angles, with each steering angle corresponding to a point in time or a position. In some embodiments, the optimized trajectory may be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle. An autonomous vehicle may be controlled autonomously, without direct human intervention, to traverse a portion of a vehicle transportation network. Although not shown separately in FIG. 1, in some implementations, an autonomous vehicle may include an autonomous vehicle control unit, which may perform autonomous vehicle routing, navigation, and control. In some implementations, the autonomous vehicle control unit may be integrated with another unit of the vehicle. For example, the controller 1300 may include the autonomous vehicle control unit.

In some implementations, the autonomous vehicle control unit may control or operate the vehicle 1000 to traverse the vehicle transportation network, or a portion thereof, in accordance with current vehicle operation parameters. In another example, the autonomous vehicle control unit may control or operate the vehicle 1000 to perform a defined operation or maneuver, such as parking the vehicle. In another example, autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to a trajectory controller that may operate the vehicle 1000 to travel from the origin to the destination using the generated route.

Figure 2:
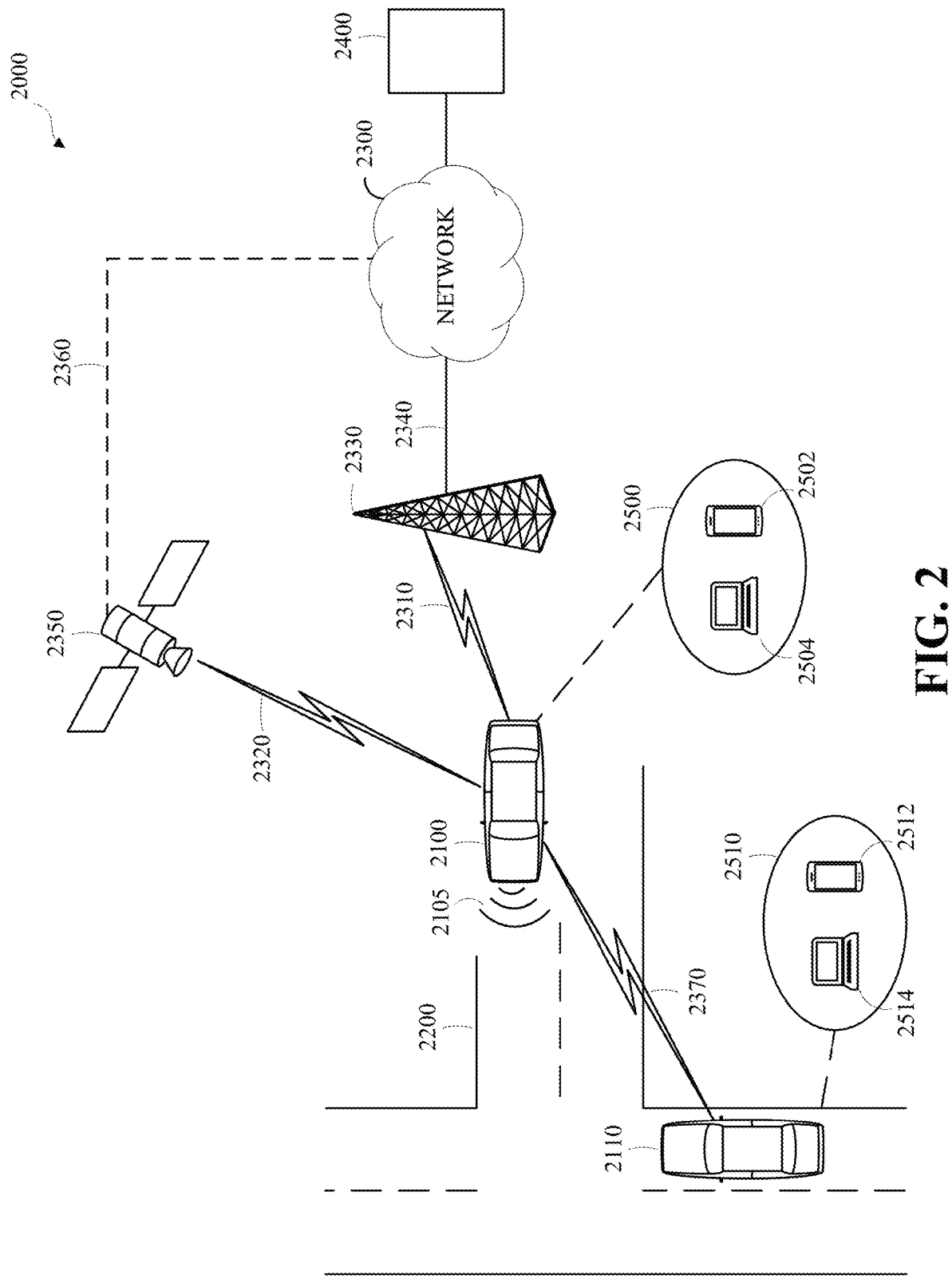
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the electronic communication network 2300.

A vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle 2100 may receive one or more automated inter-vehicle messages, such as a basic safety message (BSM), from a remote, or target, remote vehicle 2110, via a direct communication link 2370, or via an electronic communication network 2300. For example, the remote vehicle 2110 may broadcast the message to host vehicles within a defined broadcast range, such as 300 meters. In some embodiments, the vehicle 2100 may receive a message via a third party, such as a signal repeater (not shown) or another remote vehicle (not shown). In some embodiments, a vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the electronic communication network 2300 via an access point 2330. An access point 2330, which may include a computing device, may be configured to communicate with a vehicle 2100, with an electronic communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

The vehicle 2100 may communicate with the electronic communication network 2300 via a satellite 2350, or other non-terrestrial communication device. A satellite 2350, which may include a computing device, may be configured to communicate with a vehicle 2100, with an electronic communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit, an electronic communication network may include any number of interconnected elements.

A vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

A vehicle 2100 may traverse a portion or portions of one or more vehicle transportation networks 2200 using information communicated via the electronic communication network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the electronic communication network 2300, the vehicle 2100 may communicate with the communication device 2400 via any number of direct or indirect communication links. For example, the vehicle 2100 may communicate with the communication device 2400 via a direct communication link, such as a Bluetooth communication link.

A vehicle 2100/2210 may be associated with an entity 2500/2510, such as a driver, operator, or owner of the vehicle. An entity 2500/2510 associated with a vehicle 2100/2110 may be associated with one or more personal electronic devices 2502/2504/2512/2514, such as a smartphone 2502/2512 or a computer 2504/2514. A personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
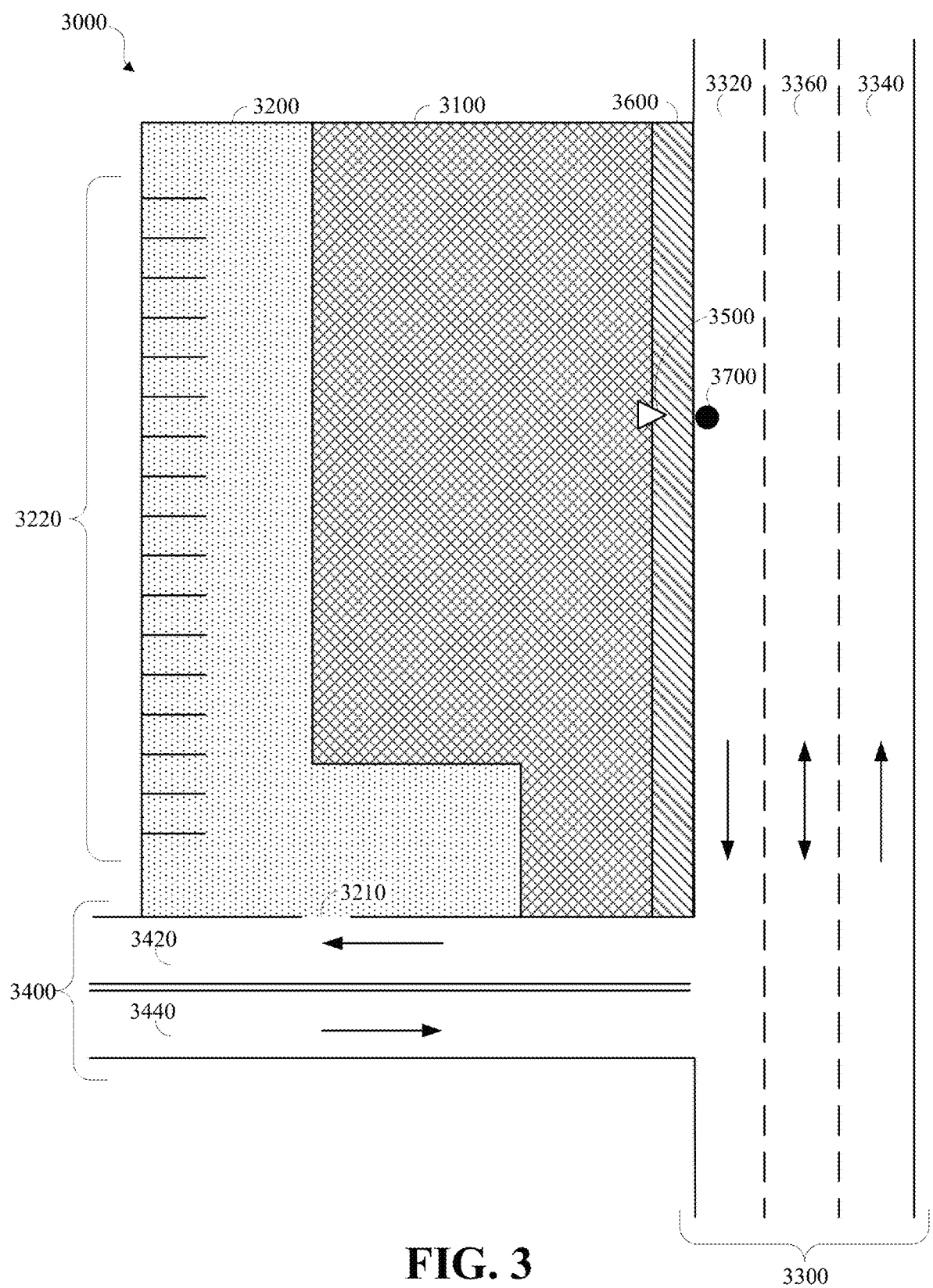
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. An autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may include vehicle transportation network control information, such as direction of travel information, speed limit information, toll information, grade information, such as inclination or angle information, surface material information, aesthetic information or a combination thereof.

A portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, an autonomous vehicle may identify the point of interest as a destination, and the autonomous vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network information may include defined entrance location information, such as information identifying a geolocation of an entrance associated with a destination. Predicted entrance location information may be determined as described herein.

The vehicle transportation network may be associated with, or may include, a pedestrian transportation network. For example, FIG. 3 includes a portion 3600 of a pedestrian transportation network, which may be a pedestrian walkway. A pedestrian transportation network, or a portion thereof, such as the portion 3600 of the pedestrian transportation network shown in FIG. 3, may be represented as pedestrian transportation network information. The vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network information may include docking location information, such as information identifying a geolocation of one or more docking locations 3700 associated with a destination. The docking location information may be defined docking location information, which may be docking location information manually included in the vehicle transportation network information. For example, defined docking location information may be included in the vehicle transportation network information based on user input. The docking location information may be automatically generated docking location information as described herein. Although not shown separately in FIG. 3, docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

In an example, an autonomous vehicle may identify a point of interest, which may include the unnavigable area 3100, the parking area 3200, and the entrance 3500, as a destination. The autonomous vehicle may identify the unnavigable area 3100, or the entrance 3500, as a primary destination for the point of interest, and may identify the parking area 3200 as a secondary destination. The autonomous vehicle may identify the docking location 3700 as a docking location for the primary destination. The autonomous vehicle may generate a route from an origin (not shown) to the docking location 3700. The autonomous vehicle may traverse the vehicle transportation network from the origin to the docking location 3700 using the route. The autonomous vehicle may stop or park at the docking location 3700 such that passenger loading or unloading may be performed. The autonomous vehicle may generate a subsequent route from the docking location 3700 to the parking area 3200, may traverse the vehicle transportation network from the docking location 3700 to the parking area 3200 using the subsequent route, and may park in the parking area 3200.

As mentioned above, the various parameters for outputting the message can include the distance of the customer from the vehicle, the determined value of a left-behind item, the compartment that is left open, the nature of the unfinished activity, more, fewer, other parameters, or a combination thereof.

In an example, the notification modality for outputting the message can be based on the location of the customer. That is, the modality can be based, at least partially, on the distance and/or proximity of the customer to the vehicle.

Figure 4:
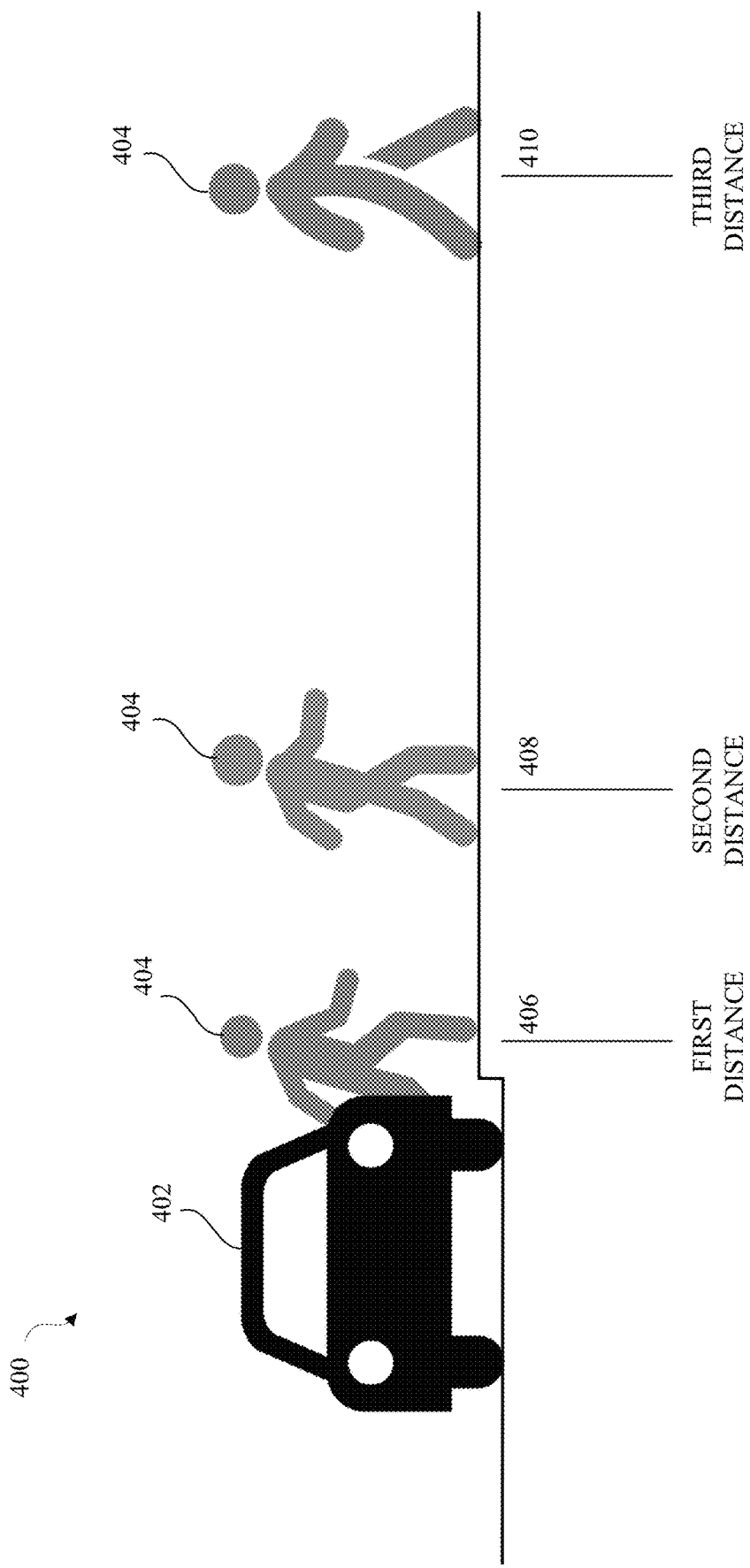
FIG. 4 is a diagram of an example 400 of different locations of a customer with respect to a vehicle in accordance with implementations of this disclosure.

FIG. 4 is a diagram of an example 400 of different locations of a customer with respect to a vehicle in accordance with implementations of this disclosure. The example 400 includes a vehicle 402 and a customer 404. The vehicle 402 can be an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The AV is configured to traverse a portion of a vehicle transportation network. The customer 404 can be a service recipient of a service provided by the vehicle 402. For example, the customer 404 can be a taxi passenger or a shuttle passenger of the vehicle 402.

At a first distance 406 away from the vehicle 402, the customer 404 is shown as leaving the vehicle 402. While in the example 400, the customer 404 is shown as being outside the vehicle 402, "leaving" the vehicle can include that the customer 404 is still inside the vehicle 402 but with a door of the vehicle 402 open indicating an intention of the customer 404 of exiting the vehicle 402; "leaving" the vehicle can also include that a the customer 404 is outside the vehicle with the customer's hand on a door (such as the handle) of the vehicle. In an example, if the customer 404 is at or within a first distance from the vehicle 402, a first notification modality can be used to output a message to the customer 404. In an example, if the customer's hand is touching the door while the door is open, whether the user is inside or outside the vehicle, then the door panel, the door handle, or other part of the door may be vibrated, to provide a haptic notification. The first notification modality can alternatively, or additionally, include an internal audio signal, an external audio signal having a first volume level, an external visual reminder, other notification modes, or a combination thereof.

At a second distance 408 away from the vehicle 402, the customer 404 is shown as within the second distance away from the vehicle 402. In an example, the second distance can be a distance between 0 and 1 meters away from the vehicle 402. In an example, if the customer 404 is within the second distance from the vehicle 402, then a second notification modality can be used to output the message to the customer 404. For example, the second notification modality can include an external audio signal having a second volume level, the external visual reminder, other visual reminders, other notification modes, or a combination thereof. The second volume level can be higher than the first volume level.

At a third distance 410 away from the vehicle 402, the customer 404 is shown as being within the third distance (i.e., between the second distance 408 and the third distance 410) away from the vehicle 402. In an example, the third distance can be a distance between 1 and 5 meters away from the vehicle 402. In an example, if the customer 404 is within the third distance from the vehicle 402, then a third notification modality can be used to output the message to the customer 404. For example, the third notification modality can include an external audio signal having a third volume level, a voice message, a text message, other notification modes, or a combination thereof. The third volume level can be higher than the second volume level.

In an example, if the customer 404 is beyond the third distance 410 away from the vehicle 402, then a fourth notification modality can be used to output the message to the customer 404. For example, the fourth notification modality can include a voice message, a text message, other notification modes, or a combination thereof.

While three distinct distances and four notification modalities are described with respect to the example 400, the disclosure herein is not so limited. Any number of distances can be used, and any number and types of respective modalities can be used. Similarly, different messages or similar messages can be output based on the distance, the value of the item, the nature of the unfinished in-vehicle activity, and so on.

Figure 5:
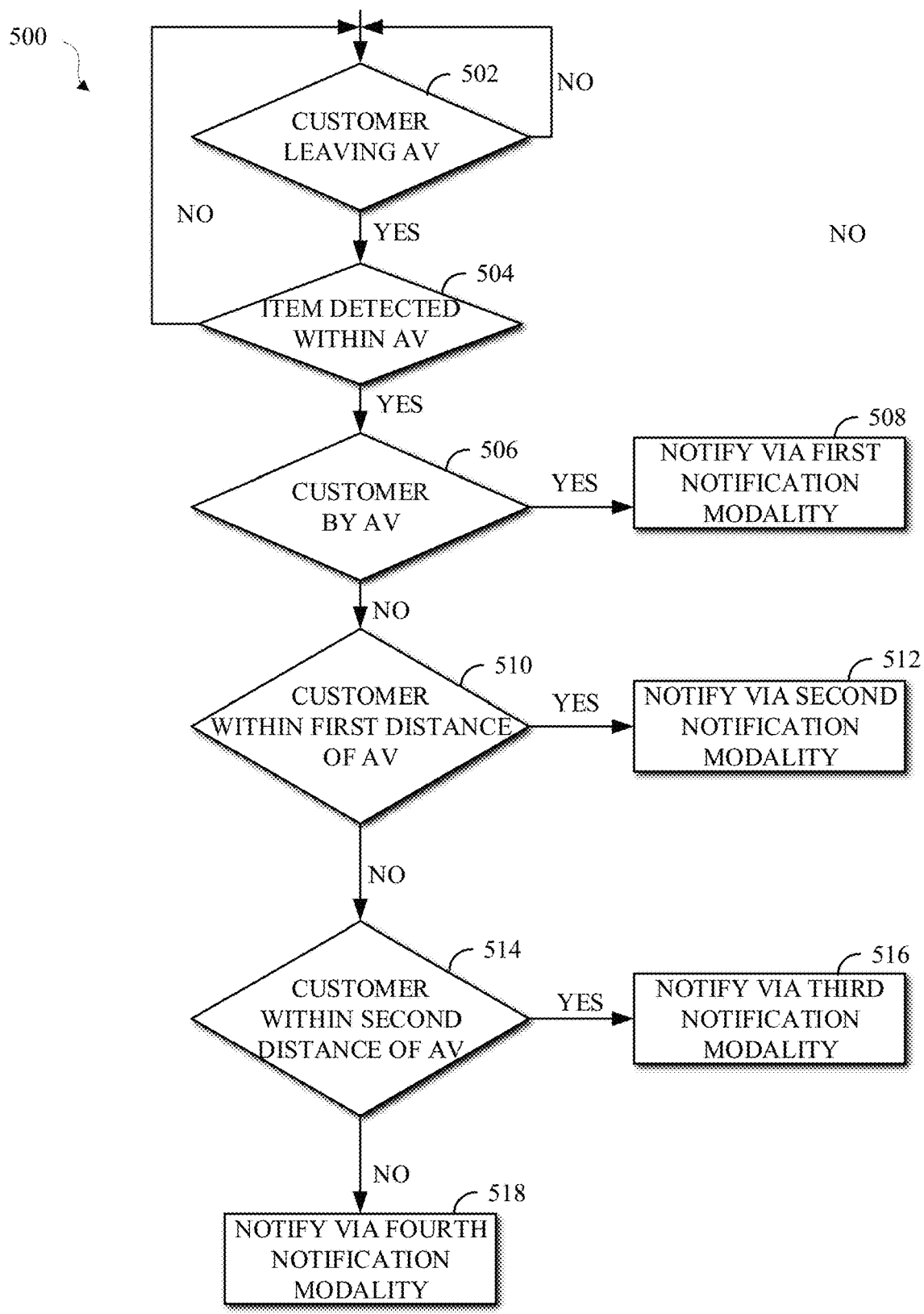
FIG. 5 is an example of process for communicating a message to a customer based on a distance of the customer from a vehicle in accordance with implementations of this disclosure.

FIG. 5 is an example of process 500 for communicating a message to a customer (i.e., a recent occupant) based on a distance of the customer from a vehicle in accordance with implementations of this disclosure. The process 500 can be implemented in or by an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The process 500 can be executed by a controller, such as the controller 1300 of FIG. 1. The process 500 can be stored, as processor-executable instructions, in a memory, such as the memory 1340 of FIG. 1. The processor-executable instructions can be executed by the processor 1330 of FIG. 1.

The process 500 communicates the message to the customer in response to, for example, detecting that the customer may be leaving an item (e.g., an item that belongs to the customer) in the vehicle. The process 500 uses different modalities to communicate the message to the customer based on a distance of the customer from the vehicle. In some example, the message may not be an explicit (e.g., verbal or textual) message; rather, the message may be intended as a reminder to the customer that the customer may have forgotten/left an item in the AV.

The process 500 can be executed in response to the vehicle being in a service mode. For example, if the vehicle is in a service mode (i.e., performing/executing a service, such as a taxi or a shuttle service), then any occupant of the vehicle can be considered to be a temporary occupant. As such, any item that the customer may leave inside the vehicle at the end of the service (e.g., when the vehicle arrives at the customer's destination) can be considered a forgotten or lost item. As such, the customer most likely wishes to be notified of lost or forgotten items.

In an example, the process 500 may not be executed in situations where the vehicle is not in a service mode. Any items left inside the vehicle may be considered to belong to an occupant who may be returning to the vehicle. As such, the item may be considered to be intentionally left in the vehicle. In another example, the process 500 is executed whether the vehicle is or is not in a service mode.

At 502, the process 500 detects whether the customer is leaving the vehicle. The process 500 can detect that the customer is leaving the vehicle in response to the vehicle arriving at a destination of the customer, in response to a door of the vehicle being opened, in response to the customer being outside the vehicle, in response to other criteria, or a combination thereof.

If the customer is leaving the vehicle, the process proceeds to 504; otherwise the process 500 returns to execute 502. The process 500 can be continuously executed, such as every several milliseconds.

At 504, the process 500 detects whether an item is detected within the vehicle. If an item is detected, then the process 500 proceeds to 506. If an item is not detected, the process 500 proceeds back to 502. In an example, the process 500 terminates if an item is not detected at 504.

The process 500 can detect an item within a vehicle in any number of ways.

For example, the vehicle can include internal sensors, which can be used to detect an item inside the vehicle. The internal sensors can include one or more internal cameras (inside the cabin of the vehicle and/or in storage compartments, such as a trunk), one or more weight differential sensors, other sensors, or a combination thereof. For example, before entry of the customer into the vehicle to start the service, one or more internal cameras of the vehicle can be used to capture first images of the interior of the vehicle and upon detecting that the customer is leaving the vehicle, the one or more internal cameras can be used to capture second images. Using differences between the first images and the second images, the process 500 can detect that one or more items are left behind. That is, the mere fact that differences between the first images and the second images exist can be indicative of left behind items. In an example, image recognition can be used to identify the item(s) left behind.

For example, the process 500 can maintain trip-based data. The trip-based data can include (e.g., maintain) for a customer, the item(s) left by the customer in the vehicle. As such, the process 500 does not send messages, as further described below, to a subsequent customer regarding an item that is left in the vehicle by a previous customer.

For example, the process 500 can detect an item within a vehicle based on the fact that a compartment (e.g., a trunk) was opened by the customer at the beginning of the service but not at the end of the service. As such, the process 500 can infer that the customer is leaving an item in the compartment.

Examples of items that may be left behind by the customer include a hat, sunglasses, a jacket, a bag, a back pack, a suitcase, a cup of coffee, a water bottle, and the like. In some cases, items may fall inadvertently from pockets of the customer, such as a wallet, a cell phone, coins, monetary bills, a paper or notebook that includes valuable information, and the like. In some cases, the items left behind may be intentionally left behind, such as an empty cup of coffee, an empty water bottle, or other items that can be considered trash.

At 506, the process 500 determines whether the customer is by the AV. The customer is by the AV if, for example, the customer is outside the AV and is touching the door (for example, to close the door). If the customer is by the AV, the process 500 proceeds to 508; otherwise the process 500 proceeds to 510. At 508, the process 500 selects a first notification modality for sending the message to the customer. The message can be intended to be a reminder or a memory tickler to the customer that the customer may have left the item inside the AV. The message can be explicit regarding the item, or, as mentioned above, an unfinished in-vehicle activity, and an action to be taken by the customer.

In an example, the first notification modality can include one or more modalities. For example, the first notification modality can include haptic feedback (for example, by vibrating the door, a door panel, or other part of the vehicle). The first notification modality can include an external audio signal. For example, in a case that the vehicle is equipped with an external speaker, the external audio can include a message that states essentially "You may have left an item in the car." In a case that the item is identified using object detection or classification, the message can include a description of the item. For example, the message can essentially state "You may have left a wallet in the car." In an example, the external audio signal can include sounding the horn. In an example, the horn can be sounded at a first volume level that is audible by the customer, using a first pattern, or a combination thereof. The first notification modality can include an external visual reminder. The visual reminder can include, for example, the flashing of lights, the projecting of an image of the left-behind item in the vicinity of the customer, the projecting of a textual message that may be similar to the above described external audible signal. The first volume can be 25%, 50%, or other percent, of a normal sound emitted by the vehicle.

At 510, if the customer is within a first distance of the vehicle, the process 500 proceeds to 512; otherwise the process 500 proceeds to 514. In an example, the first distance can be 0 to 1 meters away from the vehicle. The distance of the customer to the vehicle can be determined (e.g., measured, estimated, etc.) using sensor data. In an illustrative, non-limiting example, a point cloud received from a light detection and ranging (LiDAR) sensor (i.e., a sensor of the sensor 126) may be converted into an object, which can be determined to be the customer. The LiDAR data can be used to determine the distance of the customer to the vehicle. Similarly, sensor data from several sensors may be fused together to determine the distance of the customer.

At 512, the process 500 selects a second notification modality for sending the message to the customer. As mentioned above, the message can be intended to be a reminder or a memory tickler, and/or an explicit message, to the customer that the customer may have left the item inside the AV.

In an example, the second notification modality can include one or more modalities. For example, the second notification modality can include an external audio signal. The external audio signal can be similar to the external audio signal described with respect to the first notification modality. For example, a second volume of the external audio signal can be 25%, 50%, or other percent, of the normal sound emitted by the vehicle. In another example, the second volume can be higher than the first volume. For example, the second volume can be an additional 25% higher than the first volume. The second notification modality can include an external visual reminder, which can be similar to the external visual reminder described above with respect to the first notification modality.

At 514, if the customer is within a second distance of the vehicle, the process 500 proceeds to 516; otherwise the process 500 proceeds to 518. In an example, the second distance can be 1 to 5 meters. The distance of the customer to the vehicle can be determined (e.g., measured, estimated, etc.) using sensor data, as described above with respect to the first distance.

At 516, the process 500 selects a third notification modality for sending the message to the customer. In an example, the third notification modality can include one or more modalities. For example, the third notification modality can include an external audio signal. The external audio signal can be similar to the external audio signal described with respect to the second notification modality but can have a third volume that is higher than the second volume. The second notification modality can include a textual message that is sent to the customer. For example, the contact information of the user can be used to send a text message, an email, or other text-based message to the customer. For example, the contact information can be used to place a voice call the customer. For example, the voice call can include delivering an automated message to the customer to the effect that the item was left in the vehicle. In an example, the vehicle itself can send the text message and/or place the voice call to the customer. In another example, the vehicle sends the text message and/or places the voice call by causing a communication device, such as the communication device 2400 of FIG. 2, to send the text message and/or place the voice call. The text message can be sent to the user via (e.g., to) an application that is specific to the service and/or via an application that is specific to the service provider. For example, the application can be available (e.g., executing, running, in a state capable of receiving notifications, etc.) on a device (such as a portable device, a wearable device, etc.) of the user. In an example, the application can be an application via which the user requested the service.

At 518, the process 500 selects a fourth notification modality for sending the message to the customer. The fourth notification modality can include a text message and/or a voice call, as described above with respect to the third notification modality.

In some implementations, the message is not sent using a subsequent modality in the case that the item is no longer in the vehicle. For example, if after sending the message using the first notification modality, at 508, and before sending the message using the second notification modality, at 512, the item is not detected within the vehicle, then the message is not sent using the second notification modality or any subsequent modality; similarly, if after sending the message using the second notification modality, at 512, and before sending the message using the third notification modality, at 516, the item is not detected within the vehicle, then the message is not sent using the third notification modality or any subsequent modality; and so on. That is, after sending the message using one modality, the process 500 can terminate when the process detects that the item is no longer in vehicle, such as if the customer removed the item from the vehicle.

In some implementations, the message is not sent using a subsequent modality in the case that the customer acknowledges the message. For example, if after sending the message using the first notification modality, at 508, and before sending the message using the second notification modality, at 512, the process 500 receives an acknowledgement from the customer, then the message is not sent using the second notification modality or any subsequent modality; similarly, if after sending the message using the second notification modality, at 512, and before sending the message using the third notification modality, at 516, receives an acknowledgement from the customer, then the message is not sent using the third notification modality or any subsequent modality; and so on. That is, after sending the message using one modality, the process 500 can terminate when the process receives an acknowledgement from the customer. In an example, the acknowledgement can be an explicit acknowledgement. In an example, the acknowledgement can be an implicit acknowledgement.

In an example, an explicit acknowledgment can include receiving a text message response from the customer to the text message of the third notification modality. In an example, an explicit acknowledgment can include the customer completely and/or partially listening to the voice call.

An implicit acknowledgment can include a gesture by the customer that the process 500 can construe as dismissing the message or acknowledging the message. For example, a module (such as a human-machine interface (HMI) module of the vehicle, which may be executed by a controller, such as the controller 1300 of FIG. 1) may use one or more methodologies, techniques, or technologies of motion detection and confirmation for translating one or more gestures of the customer into an acknowledgement. For example, sensor (e.g., the sensor 1360 of FIG. 1) data (e.g., images, LiDAR data, etc.) may be compared to templates wherein a template correlates to an acknowledgement. For example, the vehicle may include one or more classifiers trained to recognize gestures, movements, and/or body positions and determine an acknowledgement. For example, a gesture recognition classifier may be used to determine whether a received gesture signal matches a gesture template to identify the gesture. For example, a backward swipe of a hand may be construed as the customer dismissing the message. For example, a thumbs-up gesture, or an OK gesture, can be construed as an acknowledgement of the message. The HMI module can be trained to recognize other or additional gestures as the customer acknowledging and/or dismissing the message.

In an implementation, the process 500, may not detect the customer at one distance, but may detect the customer at another distance. As such, the process 500 sends a message when the customer is detected at the other distance. For example, the customer may not be detected at 510 but is detected at 514. As such, the process does not perform the operation 512, but does perform the operation 516.

In an implementation, while not specifically shown in FIG. 5, the process 500 can send only one notification. For example, if the process 500 performs one of 508, 512, or 516, then any other subsequent message is not sent. In an implementation, the process 500 always performs the operation 518, unless the customer retrieved the item.

The process 500 describes selecting a modality for sending a message (or messages) to the customer based on the distance of the customer to the vehicle. However, the disclosure herein is not so limited. In some implementations, the modality can be selected based, additionally or alternatively, on the value of the item. For example, the message(s) may be sent using more modalities and at different distance intervals for a more valuable item than a less valuable item. For example, a wallet may be considered more valuable than a cup of coffee. For example, money (e.g., coins and/or paper bills) may be considered more valuable than a crumbled piece of paper. In some examples, the location of the item in the vehicle can also be used to select the number of modalities to use.

Figure 6:
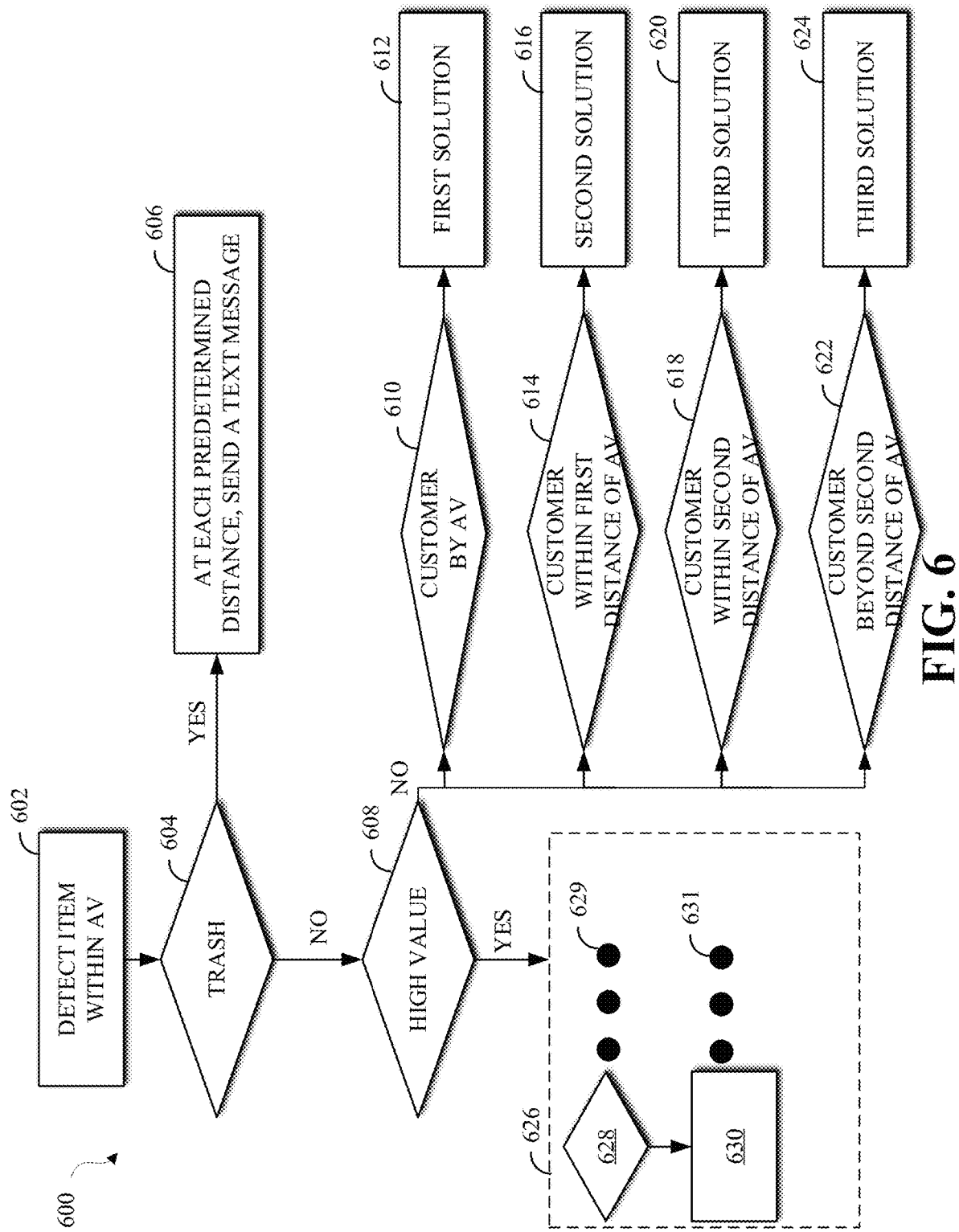
FIG. 6 is an example of a process for communicating a message to a customer based on a value of an item left in a vehicle in accordance with implementations of this disclosure.

FIG. 6 is an example of a process 600 for communicating a message to a customer based on a value of an item left in a vehicle in accordance with implementations of this disclosure. The process 600 can be implemented in or by an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The process 600 can be executed by a controller, such as the controller 1300 of FIG. 1. The process 600 can be stored, as processor-executable instructions, in a memory, such as the memory 1340 of FIG. 1. The processor-executable instructions can be executed by the processor 1330 of FIG. 1.

The process 600 communicates the message to the customer in response to, for example, detecting that the customer may be leaving an item (e.g., an item that belongs to the customer) in the vehicle. The process 600 uses different modalities to communicate the message(s) to the customer based on a value of the item and a distance of the customer from the vehicle. In some example, the message(s) may not be explicit (e.g., verbal or textual) message(s); rather, the message(s) may be intended to reminder the customer that the customer may have forgotten/left an item in the AV.

The process 600 can be executed in response to the vehicle being in a service mode. For example, if the vehicle is in a service mode (i.e., performing/executing a service, such as a taxi or shuttle service), then any occupant of the vehicle can be considered a temporary occupant (i.e., a customer). As such, any item that the customer may leave inside the vehicle at the end of the service (e.g., when the vehicle arrives at the customer's destination) can be considered a forgotten or lost item. As such, the customer most likely wishes to be notified of lost or forgotten items.

In an example, the process 600 may not be executed in situations where the vehicle is not in a service mode. Any items left inside the vehicle may be considered to belong to an occupant who may be returning to the vehicle. As such, the item may be considered to be intentionally left in the vehicle. In another example, the process 600 is executed whether the vehicle is or is not in a service mode.

At 602, the process 600 detects an item within the AV. The process 600 can detect the item as described with respect to 504 of FIG. 5. Using, for example, object recognition and classification, the process 600 can determine a value for the item. For simplicity of explanation, the process 600 is described with respect to three item values; namely, trash, high value, and not high value. A trash item is an item that is of zero or negligible value, such as a crumbled piece of paper or an empty water bottle. A high value item may be, for example, a wallet, a ring, a mobile phone, etc. Examples of non-high value items include sunglasses, a hat, etc.

In an example, a threshold dollar value can be used to determine whether the item is or is not of high value. For example, if the item is likely to be valued at greater than $250 (or some other threshold dollar value), then the item can be considered to be a high value item; otherwise the item can be considered a non-high value item.

The value of the item can also be determined based on an intangible value of the item. For example, a ring, a necklace, and other items that may have emotional value to the owner can be considered high-value items, regardless of their monetary values.

At 604, the process 600 determines whether the item is a valued as a trash item. If the item is valued as trash, the process 600 proceeds to 606; otherwise the process 600 proceeds to 608.

At 606, the process 600 can, at predetermined distances of the customer from the vehicle, send a text message to the customer indicating that the customer has left an item in the vehicle. As such, the selected modality is the sending of a text message.

The predetermined distances can be as described with respect to the process 500. That is, the process 600 can send a first text message to the customer when the customer is within the first distance away from vehicle, a second text message when the customer is within the second distance away from the vehicle, and so on. In an example, the same text message is sent at every distance, or at some of the distances. In another example, a different message can be sent at every distance. In an example, the text message can request that the customer remove the item from them vehicle. In an example, when the customer is beyond the second distance, the text message can indicate that the item will be trashed (i.e., disposed of).

In an example, the text message can provide an incentive to the customer to remove the item from the vehicle. Such a message can be sent, for example, when the customer is within the second distance away from the vehicle. In an example, the incentive can be a discount on a cost (e.g., ride fare) related to the just-completed service. As such, upon the process 600 detecting that the customer has removed then item, the process 600 can cause the payment system to credit the customer according to the incentive. In another example, the incentive can be a discount on a subsequent service. As such, upon the process 600 detecting that the customer has removed the item, the process 600 can send, or cause to be sent, a discount voucher, an incentive code, or the like, to the customer.

At 608, the process 600 determines whether the item is a high-value item. If the item is not a high-value item, the process 600 proceeds to one of 610, 614, 618, or 622, depending on the distance of the customer to the vehicle; otherwise, the process 600 proceeds to block 626. While the operations 610-624 are arranged differently than the operations of the process 500, a person skilled in the art can appreciate that the operations 610-624 can be as described with respect to the process 500.

At 610, if the customer is by the vehicle, the process 600 proceeds to 612. The process 600 can detect that the customer is by the vehicle as described with respect to 506 of FIG. 5. At 612, the process 600 selects a first solution for dealing with the item. In an example, the first solution can include selecting a first notification modality for sending a message (e.g., a reminder) to the customer that the customer may be forgetting the item in the vehicle and sending the message. In an example, the first solution can be as described with respect to notifying via a first notification modality at 508.

At 614, if the customer is within a first distance of the vehicle, the process 600 proceeds to 616. In an example, the first distance can be as described with respect to the first distance of FIG. 5. As such, the process 600 can detect that the customer is within the first distance of the vehicle as described with respect to 510 of FIG. 5. At 616, the process 600 selects a second solution for dealing with the item. In an example, the second solution can include selecting a second notification modality for sending a message to the customer and sending the message. In an example, the second solution can be as described with respect to notifying via a second notification modality, at 512 of FIG. 5.

At 618, if the customer is within a second distance of the vehicle, the process 600 proceeds to 620. In an example, the second distance can be as described with respect to the second distance of FIG. 5. As such, the process 600 can detect that the customer is within the second distance of the vehicle as described with respect to 514 of FIG. 5. At 620, the process 600 selects a third solution for dealing with the item. In an example, the third solution can include selecting a third notification modality for sending a message to the customer and sending the message. In an example, the third solution can be as described with respect to notifying via a third notification modality, at 516 of FIG. 5.

At 622, if the customer is beyond the second distance from the vehicle, the process 600 proceeds to 624. In an example, the second distance can be as described with respect to the second distance of FIG. 5. As such, the process 600 can detect that the customer is beyond the second distance from the vehicle as described with respect to 514 of FIG. 5. At 624, the process 600 selects a fourth solution for dealing with the item. In an example, the fourth solution can include selecting a fourth notification modality for sending a message to the customer and sending the message. In an example, the fourth third solution can be as described with respect to notifying via a fourth notification modality, at 518 of FIG. 5.

Reference is now again made to 606 to provide example solutions that can be selected by the process 600 in a case that, at 604, the item is determined to be trash. In an example, when the process 600 determines that the customer is not likely to return to retrieve the item, such as, for example, when the customer is beyond the second distance from the vehicle, a solution can be selected based on the trash level. In an example, the process 600 can simply cause the vehicle to be operated to reroute itself to a location where the item can be removed. In an example, a remote operator can, using the internal cameras of the vehicle, determine the level of trash in the vehicle and, accordingly, route or not route the vehicle to a servicing (e.g., cleaning) facility. Similarly, if the customer is beyond the second distance of the vehicle, at 514 of FIG. 5, the process 600 can select a notification modality to notify a remote operate that an item is left in the vehicle. The remote operator may initiate a voice call to the customer. The remote operator may determine whether to route the vehicle to a servicing facility.

Returning to FIG. 6, at the block 626, the process 600 can select one or more solutions in response to a high-value item being left in the vehicle by a customer. In an example, in the block 626, the process 600 can select different solutions depending on the distance of the customer from the vehicle. Determining the distance(s) of the customer from the vehicle is(are) illustrated by a decision 628 (and ellipsis 629). The selected solution(s) is(are) illustrated by a solution 630 (and ellipsis 631). The decision 628 can be as described with respect to, for example, any of 506, 510, and 514 of FIG. 5 or any of 610, 614, 618, and 622 of FIG. 6. The solution 630 can be as described with respect to, for example, any of 508, 512, 516, and 518 of FIG. 5 or any of 606, 612, 616, 620, and 624 of FIG. 6, or any other solution described herein. In an example, the decision 628 can determine that the customer is beyond a certain distance of the vehicle and the solution 630 can be that the vehicle is operated to follow behind the customer, stay stationary, or similar solution such that the vehicle remains proximal to the to customer. In another example, the vehicle can be caused to navigate to a servicing location so that the item can be retrieved and deposited in lost-and-found. The customer can then be sent a notification of the address of the lost-and-found location so that the customer can claim the item.

Examples use cases illustrating decisions, solutions and/or notification modalities, as described with respect to FIGS. 5-6, are now provided. In the scenarios below, a system, such as the controller 1300 of the vehicle 1000 of FIG. 1, is executing a process that is consistent with the ones described with respect to FIGS. 5-6.

In a first illustrative use case, a customer is detected (e.g., at 502) as leaving the car and door close is detected. A left-over item is detected and identified as sunglasses (e.g., at 504 or 602). If the customer's hand is still on the door (e.g., at 506 or at 610), the system sends (e.g., at 508 or 612) haptic feedback and/or external audio and/or external visual reminders (e.g., the first notification modality of FIG. 5 or the first solution of FIG. 6) reminding the customer to confirm that sunglasses are left in the vehicle and to take them, if they belong to the customer. If the customer is within 1 meter of the vehicle (e.g., the first distance at 510 or the first distance at 614), the system sends external audio with higher volume and/or external visual reminders (e.g., the second notification modality of FIG. 5 or the second solution of FIG. 6). If the customer is within 1 to 5 meters of the vehicle (e.g., second distance at 514 or the second distance at 618), the system sends external audio with highest volume and/or call/voice messages and/or text message reminders (e.g., the third notification modality of FIG. 5 or the third solution of FIG. 6). If the customer is beyond 5 meters of the vehicle, the system sends call/voice message and/or text message reminders (e.g., the fourth notification modality of FIG. 5 or the fourth solution of FIG. 6).

In a second illustrative use case, a customer is detected (e.g., at 502) as leaving the car and door close is detected. A left-over item is detected and identified as coffee cup (e.g., at 504 or 602). If the customer's hand is still on the door (e.g., at 506 or at 606), the system sends (e.g., at 508 or at 606) haptic feedback and/or external audio and/or external visual reminders (e.g., the first notification modality of FIG. 5) reminding the customer to confirm that coffee cup is left in the vehicle and to take it, if it belongs to the customer. If the customer is within 1 meter of the vehicle (e.g., the first distance at 510 or at 606), the system an external audio with higher volume and/or external visual reminders (e.g., the second notification modality of FIG. 5 or at 606). If the customer is beyond 1 meter of the vehicle, the system sends a text message with a statement that the coffee cup will be cleaned up/trashed (e.g., the fourth notification modality of FIG. 5 or at 606). Note that in this scenario, because the item is determined to be a trash item, the system does not check whether the customer is within a second distance (e.g., 1-5 meters) of the vehicle.

In a third illustrative use case, a customer is detected (e.g., at 502) as leaving the car and door close is detected. A left-over item is detected and identified as coins (e.g., at 504 or 608). As such, the item is identified at 608 of FIG. 6. As a non-high value item. If the customer's hand is still on the door (e.g., at 506 or at 610), the system sends (e.g., at 508 or 612) haptic feedback and/or external audio and/or external visual reminders (e.g., the first notification modality of FIG. 5 or the first solution of FIG. 6) reminding the customer to confirm that coins are left in the vehicle and to take them, if they belong to the customer. If the customer is within 1 meter of the vehicle (e.g., the first distance at 510 or the first distance at 614), the system sends external audio with higher volume and/or external visual reminders (e.g., the second notification modality of FIG. 5 or the second solution of FIG. 6). If the customer is within 1 to 5 meters of the vehicle (e.g., second distance at 514 or the second distance at 618), the system sends external audio with highest volume and/or text message reminders (e.g., the third notification modality of FIG. 5 or the third solution of FIG. 6). If the customer is beyond 5 meters of the vehicle, the system sends a text message reminder (e.g., the fourth notification modality of FIG. 5 or the fourth solution of FIG. 6). In an example, the text message can include the options "I will retrieve" or "donate." If the system does not receive a response to the message (for example, within a predefined period of time, which may be stated in the message), the system can assume that the customer chose "donate." If the customer responds by selecting the "I will retrieve" option, the system can cause the vehicle to wait for the customer to return to retrieve the item.

Figure 7:
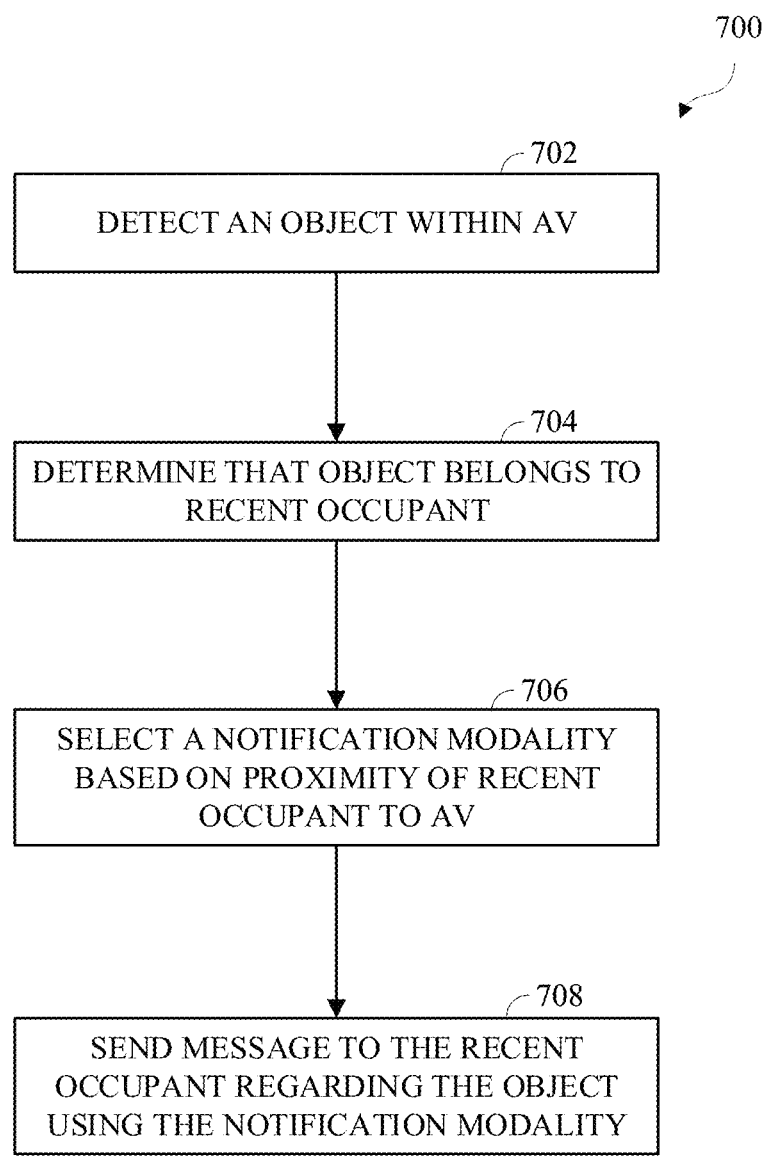
FIG. 7 is an example of a process for providing a service by an autonomous vehicle (AV) in accordance with implementations of this disclosure.

FIG. 7 is an example of a process 700 for providing a service by an autonomous vehicle (AV) in accordance with implementations of this disclosure. The process 700 can be implemented in or by an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The process 700 can be executed by a controller, such as the controller 1300 of FIG. 1. The process 700 can be stored, as processor-executable instructions, in a memory, such as the memory 1340 of FIG. 1. The processor-executable instructions can be executed by the processor 1330 of FIG. 1.

At 702, the process 700 detects, based on sensor information, an object within the AV. The object (i.e., item) can be detected as described with respect to 504 of FIG. 5 or 602 of FIG. 6. At 704, the process 700 determines that the object belongs to a recent occupant of the AV. As described above, in an example, the process 700 can determine that the object belongs to the recent occupant (i.e., a customer) based on image differences between one or more images that are captured before the start of a service that is provided to the recent occupant using the AV and one or more images that are captured at the end of the service. In another example, and as described above, trip-based data can be used to determine that the object belongs to the recent occupant, as described above.

In response to determining that the object belongs to the recent occupant of the AV, the process 700, at 706, selects a notification modality for sending a message to the recent occupant regarding the object; and, at 708, sends the message using the notification modality. The process 700 can select the notification modality based on a proximity of the recent occupant to the AV. The notification modality is selected consistent with the foregoing descriptions of FIGS. 5-6 and the illustrative use cases.

In a case that the recent occupant is within the AV, the notification modality can include displaying, on a display of the AV, an image of the object. In a case that the recent occupant is not within the AV, the notification modality can include an external audible notification. A volume of the external audible notification can be based on a distance between the recent occupant and the AV. In a case that the recent occupant is not within the AV, the notification modality can include an external visible notification. In a case that the recent occupant is beyond a threshold distance of the AV, the notification modality can include sending an electronic notification to the recent occupant. The electronic notification can be or can include one or more of a text message, an email, other electronic notification, or a combination thereof.

In an example, the process 700 can include determining a value of the object and selecting the notification modality can be further based on the value of the object.

Figure 8:
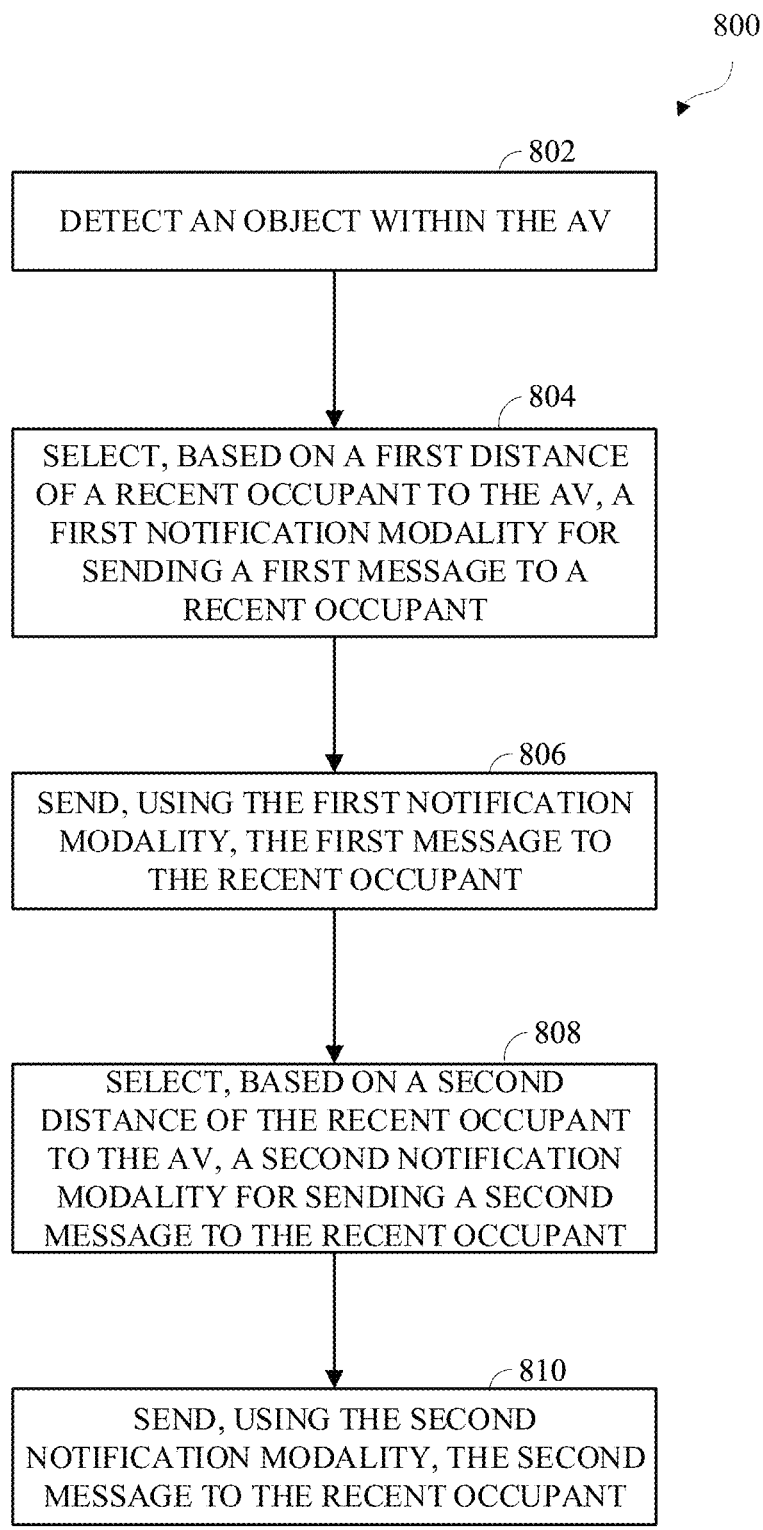
FIG. 8 is an example of a process for providing a service by an autonomous vehicle (AV) in accordance with implementations of this disclosure

FIG. 8 is an example of a process 800 for providing a service by an autonomous vehicle (AV) in accordance with implementations of this disclosure. The process 800 can be implemented in or by an autonomous vehicle (AV), such as the vehicle 1000 shown in FIG. 1 or one of the vehicles 2100/2110 shown in FIG. 2. The AV may be a semi-autonomous vehicle, or any other vehicle implementing autonomous driving. The process 800 can be executed by a controller, such as the controller 1300 of FIG. 1. The process 800 can be stored, as processor-executable instructions, in a memory, such as the memory 1340 of FIG. 1. The processor-executable instructions can be executed by the processor 1330 of FIG. 1.

At 802, the process 800 detects, using sensor information, an object within the AV. The object (i.e., item) can be detected as described with respect to 702 of FIG. 7. At 804, the process 800 selects, based on a first distance of a recent occupant to the AV, a first notification modality for sending a first message to the recent occupant, the first message indicating that the object is left by the recent occupant in the AV. At 806, the process 800 sends, using the first notification modality, the first message to the recent occupant. At 808, the process 800 selects, based on a second distance of the recent occupant to the AV, a second notification modality for sending a second message to the recent occupant. At 810, the process 800 sends, using the second notification modality, the second message to the recent occupant.

In an example, the second notification modality can include sending a text message to the recent occupant and the process 800 can further include receiving, from the recent occupant, a response to the text message. In an example, the first notification modality can include at least one of haptic feedback, an audio signal, or a visual signal. In an example, the second notification modality can include at least one of an audio signal or a visual signal.

In an example, the process 800 can further include selecting the second notification modality and sending the second message in response to detecting that the object within the AV after sending, using the first notification modality, the message. In an example, the process 800 can further include selecting, based on a third distance of the recent occupant to the AV, a third notification modality for sending a third message to the recent occupant; and sending, using the third notification modality, the third message to the recent occupant.

As mentioned above, in addition to sending messages to a recent occupant regrading an item left in a vehicle, the teachings herein can be used to send the recent occupant messages regarding un-finished activities related to the service may need to be provided using the vehicle.

Accordingly, a process that can be executed by the vehicle, such as by a controller of the vehicle, can include detecting that a recent occupant of the AV has not completed an in-vehicle activity; and, in response to the detecting that the recent occupant of the AV has not completed an in-vehicle activity, selecting, based on a proximity of the recent occupant to the AV, a notification modality for sending a message to the recent occupant regarding the in-vehicle activity, and sending the message using the notification modality. The in-vehicle activity can include that at least one of a door of the vehicle or a trunk of the vehicle is open. The in-vehicle activity can include an unfinished electronic payment of the recent occupant.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that may tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored on memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the processes disclosed herein may occur in various orders or concurrently. Additionally, elements of the processes disclosed herein may occur with other elements not explicitly presented and described herein. Furthermore, not all elements of the processes described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An autonomous vehicle (AV), the AV comprising:
   a processor configured to execute instructions stored on a non-transitory computer readable medium to:
   detect, based on sensor information, an object within the AV;
   determine that the object belongs to a recent occupant of the AV; and in response to determining that the object belongs to the recent occupant of the AV:
  select, based on a proximity of the recent occupant to the AV, a notification modality for sending a message to the recent occupant regarding the object, wherein to select the notification modality comprises to:
    in a first case that the recent occupant is outside of the AV and the recent occupant is not beyond a threshold distance from the AV, select a first notification modality for sending the message to the recent occupant; and
    in a second case that the recent occupant is outside of the AV and the recent occupant is beyond the threshold distance from the AV, select a second notification modality for sending the message to the recent occupant, wherein the second notification modality is different from the first notification modality and wherein the second notification modality comprises sending an electronic notification to the recent occupant; and send the message using the notification modality.

2. The AV of claim 1, wherein in a case that the recent occupant is within the AV, the notification modality comprises displaying, on a display of the AV, an image of the object.

3. The AV of claim 1, wherein in a case that the recent occupant is not within the AV, the notification modality comprises an external audible notification.

4. The AV of claim 3, wherein a volume of the external audible notification is based on a distance between the recent occupant and the AV.

5. The AV of claim 1, wherein in a case that the recent occupant is not within the AV, the notification modality comprises an external visible notification.

6. The AV of claim 1, wherein the instructions further include instructions to:
  operate the AV to follow the recent occupant.

7. The AV of claim 1,
  wherein the instructions further comprise instructions to:
    determine a value of the object; and
  wherein the selecting the notification modality for sending the message is further based on the value of the object.

8. The AV of claim 1, wherein the instructions further include instructions to:
  in response to determining that the recent occupant of the AV is touching a part of the AV and that the object is within the AV, vibrate the part of the AV.

9. An autonomous vehicle (AV) comprising:
  a processor configured to execute instructions stored on a non-transitory computer readable medium to:
    detect, based on sensor information, an object within the AV;
    select, based on a first distance of a recent occupant to the AV, a first notification modality for sending a message to the recent occupant, the message indicating that the object is left by the recent occupant in the AV;
    send, using the first notification modality, the message to the recent occupant;
    select, based on a second distance of the recent occupant to the AV, a second notification modality for sending the message to the recent occupant;
    select, based on a third distance of the recent occupant to the AV, a third notification modality for sending the message to the recent occupant; and
    send, using the third notification modality, the message to the recent occupant; and
    send, using at least one of the first notification modality, the second notification modality, or the third notification modality the message to the recent occupant.

10. The AV of claim 9,
  wherein the second notification modality comprises sending a text message to the recent occupant; and
  wherein the instructions further include instructions to:
    receive, from the recent occupant, a response to the text message.

11. The AV of claim 9, wherein the first notification modality comprises at least one of haptic feedback, an audio signal, or a visual signal.

12. The AV of claim 9, wherein the second notification modality comprises at least one of an audio signal or a visual signal.

13. The AV of claim 9, wherein the instructions further include instructions to:
  select the second notification modality and send the message in response to detecting that the object is within the AV after sending, using the first notification modality, the message.

14. The AV of claim 9,
  wherein the instructions further comprise instructions to:
    determine a value of the object; and
  wherein to select at least one of the first notification modality, the second notification modality, or the third notification modality is further based on the value of the object.

15. A method for providing a service by an autonomous vehicle (AV) comprising:
  detecting, based on sensor information, an object within the AV;
  selecting, based on a first distance of a recent occupant to the AV, a first notification modality for sending a first message to the recent occupant, the first message indicating that the object is left by the recent occupant in the AV;
  sending, using the first notification modality, the first message to the recent occupant;
  selecting, based on a second distance of the recent occupant to the AV, a second notification modality for sending a second message to the recent occupant, wherein the second notification modality comprises sending a text message to the recent occupant;
  sending, using the second notification modality, the second message to the recent occupant; and
  receiving, from the recent occupant, a response to the text message.

16. The method of claim 15, wherein the first notification modality comprises at least one of haptic feedback, an audio signal, or a visual signal.

17. The method of claim 15, wherein at least one of the first notification modality or the second notification modality comprises at least one of an audio signal or a visual signal.

18. The method of claim 15, further comprising:
  selecting the second notification modality and sending the second message in response to detecting that the object is within the AV after sending, using the first notification modality, the first message.

19. The method of claim 15, further comprising:
  selecting, based on a third distance of the recent occupant to the AV, a third notification modality for sending a third message to the recent occupant; and sending, using the third notification modality, the third message to the recent occupant.

20. An autonomous vehicle (AV) comprising:
a processor configured to execute instructions stored on a non-transitory computer readable medium to:
   detect that a recent occupant of the AV has not completed an in-vehicle activity, wherein the in-vehicle activity is one of a set of in-vehicle activities including that an electronic payment of the recent occupant is unfinished; and
   in response to detecting that the recent occupant of the AV has not completed the in-vehicle activity:
      select, based on a proximity of the recent occupant to the AV, a notification modality for sending a message to the recent occupant regarding the in-vehicle activity; and
      send the message using the notification modality.

21. The AV of claim 20, wherein the set of in-vehicle activities further includes that at least one of a door of the AV or a trunk of the AV is open.

* * * * *